(No Model.)  2 Sheets—Sheet 1.
L. C. RICE.
DYNAMO ELECTRIC MACHINE.
No. 588,602.  Patented Aug. 24, 1897.
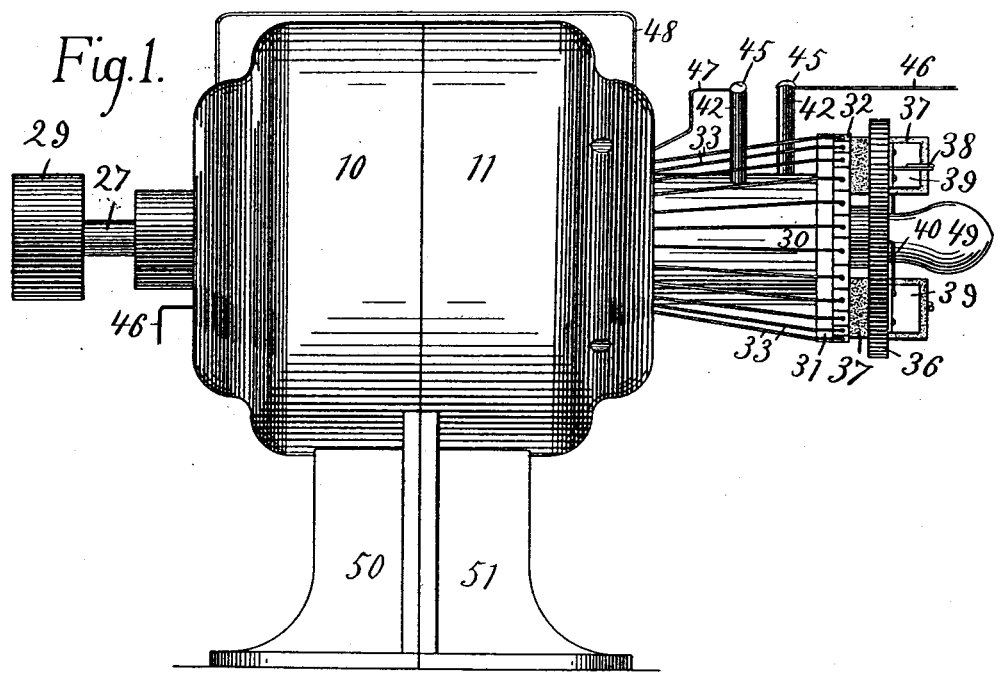
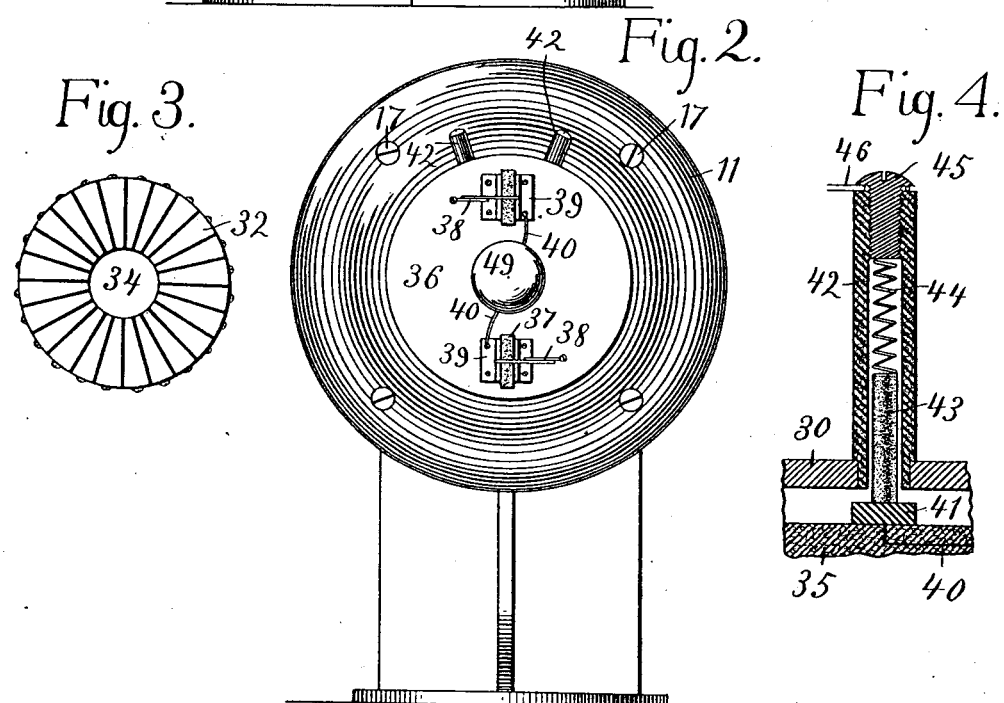
Witnesses
W. C. Alexander.
E. E. Vinnell
Inventor
Lewis C. Rice
By Attorneys
Fowler & Fowler (No Model.) 2 Sheets—Sheet 2.

L. C. RICE.
DYNAMO ELECTRIC MACHINE.

No. 588,602. Patented Aug. 24, 1897.

Witnesses
W. A. Alexander.
E. E. Vinnell

Inventor
Lewis C. Rice
By Attorneys
Fowler & Fowler

UNITED STATES PATENT OFFICE.

LEWIS C. RICE, OF ST. LOUIS, MISSOURI, ASSIGNOR OF ONE-HALF TO THE WILLIAM ELLISON & SONS MANUFACTURING COMPANY, OF SAME PLACE.

DYNAMO-ELECTRIC MACHINE.

SPECIFICATION forming part of Letters Patent No. 588,602, dated August 24, 1897.

Application filed November 4, 1896. Serial No. 611,029. (No model.)

*To all whom it may concern:*

Be it known that I, LEWIS C. RICE, a citizen of the United States, residing at the city of St. Louis, in the State of Missouri, have invented a certain new and useful Dynamo-Electric Machine, of which the following is such a full, clear, and exact description as will enable any one skilled in the art to which it appertains to make and use the same, reference being had to the accompanying drawings, forming part of this specification.

The principal object of my invention is to construct a dynamo-electric machine or motor in which both the armature and the coils of the field-magnets shall be stationary.

My invention consists in the various novel features and details of construction set forth in the following specification and pointed out in the claims affixed hereto.

Figure 5:
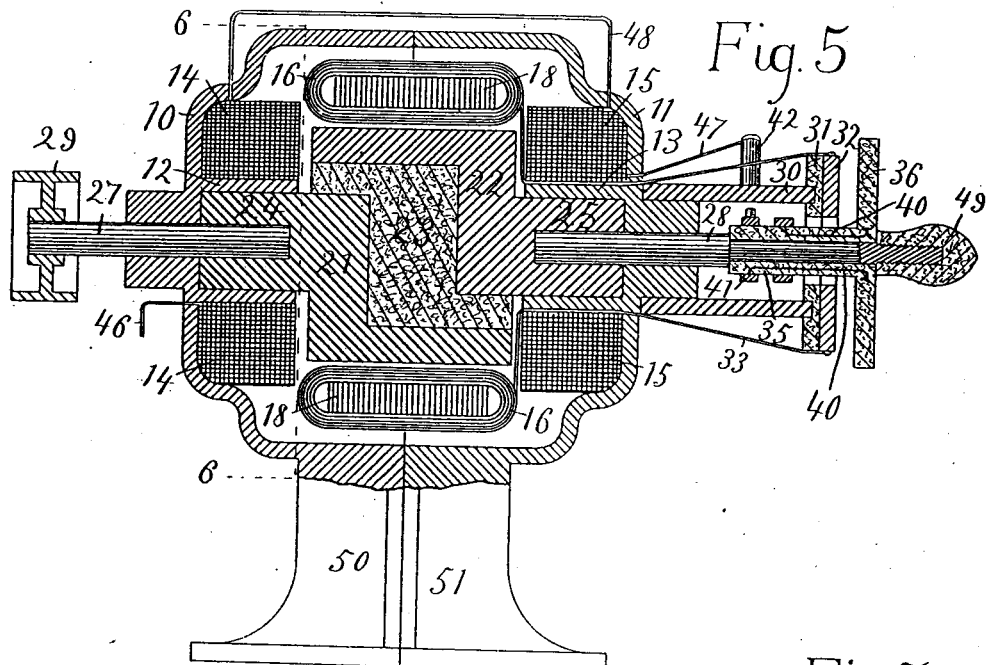
Figure 6:
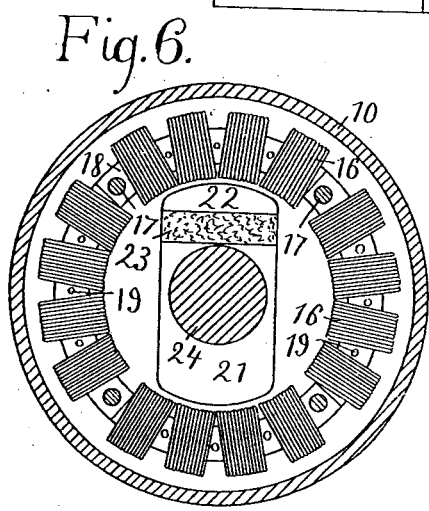
Figure 7:
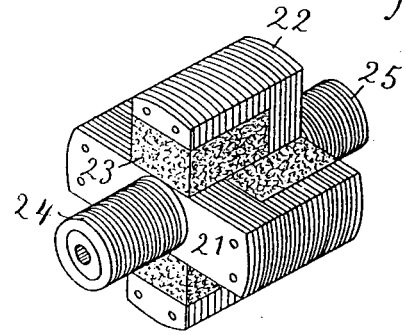
Figure 8:
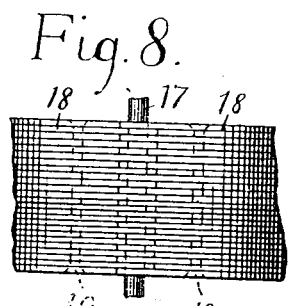

In the accompanying drawings, which illustrate a dynamo or motor embodying my invention, Figure 1 is a side elevation. Fig. 2 is an end view. Fig. 3 is a detail view of the commutator. Fig. 4 is an enlarged sectional view showing a detail of construction. Fig. 5 is a longitudinal vertical section. Fig. 6 is a section on the line 6 6 of Fig. 5. Fig. 7 is an isometric projection showing a modification of the rotary inductor-magnet, which is interposed between the field-magnets and the armature; and Fig. 8 is a view showing a detail of construction.

Like marks of reference refer to similar parts in the several views of the drawings.

10 and 11 are the two halves of the casing of the dynamo. Projecting from the parts 10 and 11 into the interior of the casing are hollow cylindrical projections 12 and 13, Fig. 5, respectively, around which are placed field-magnet coils 14 and 15, respectively. The coils 14 and 15 are so wound that the opposing ends of the projections 12 and 13 will be of opposite polarity.

16 is a Gramme, Pacinotti, or other suitable ring-armature, which is held in place by a suitable number of bolts 17, which also connect the two halves 10 and 11 of the casing. The core 18 of the armature 16 is made in a suitable number of sections which join, as shown in Fig. 8, and are held together by the bolts 17, so that when the said bolts 17 are removed the sections of the armature can be taken apart to give easy access to any coil which may have been injured. As the armature is stationary, there is no strain due to centrifugal force upon the armature-coils, so they need not be firmly bound to the core, as is the case with revolving armatures. On account of this the coils can be easily removed. The laminæ of each section are held together by suitable bolts or rivets 19. (Shown in dotted lines in Fig. 8.)

Within the armature 16 is a rotating part which I term a "rotary" inductor-magnet or pole-piece. The inductor-magnet is composed of two L-shaped pieces of iron 21 and 22, which are separated by a suitable block 23, of compressed fiber, brass, or other nonmagnetic material. Upon the L-shaped pieces 21 and 22 are formed cylindrical projections 24 and 25, respectively. The projections 24 and 25 extend into the hollow cylinders 12 and 13. The projections 24 and 25 are of such a size as to revolve freely in the hollow cylinders 12 and 13, but leave as small air-spaces as possible, so as to give the least possible resistance to the passage of the lines of magnetic force.

In Fig. 7 is shown a modification of the inductor-magnet, in which the pieces 21 and 22 are made U-shaped instead of L-shaped, thus giving the magnet four instead of two poles. From this it will readily be seen how the magnet can be constructed with any desired number of poles. This view also shows how the inductor-magnet may be formed of laminæ or thin sheets of metal to prevent the generation of Foucault currents, which would absorb energy and heat the magnet.

The inductor-magnet is carried by two shafts 27 and 28, preferably made of non-magnetic material, which are secured in the projections 24 and 25, respectively, and journaled in bearings carried by the parts 10 and 11 of the casing. On the shaft 27 is carried a pulley or belt-wheel 29. Secured to the part 11 of the casing is a sleeve 30, to the end of which is secured a disk 31, of compressed fiber or other insulating material, carrying a disk commutator 32. (Shown in detail in Fig. 3.)

The plates of the commutator 32 are connected by wires 33 with the armature 16. Carried on the shaft 28 and extending partly within the sleeve 30 through an opening 34 in the disk 31 and commutator 32 is a sleeve 35, of compressed fiber or other insulating material, having formed on it a disk 36.

In the disk 36 are carried two carbon-brushes 37, Figs. 1 and 2, which are pressed against the commutator by springs 38 and make contact with metallic plates 39 on the said disk 36. From the plates 39 two wires 40, Figs. 2 and 5, extend through the disk 36 and sleeve 35 to two copper rings 41, carried on the sleeve 35. Extending through the sleeve 30 are two tubes 42, of compressed fiber or other insulating material, one of which is shown in detail in Fig. 4. In each of the tubes 42 is a rod 43, of carbon, which is pressed against one of the rings 41 by a coil-spring 44, held in place by a screw 45, which also acts as a binding-post. To one of the binding-posts 45 is secured one end of the line-wire 46, Fig. 1, and from the other a wire 47 leads to one end of the field-magnet coil 15. From the opposite end of the coil 15 a wire 48 leads to one end of the field-magnet coil 14, and to the opposite end of the coil 14 is secured the remaining end of the line-wire 46. The disk 36 and sleeve 35 are held upon the shaft 28 by a nut 49. By loosening the nut 49 the disk 36 may be rotated on the shaft 28 to adjust the brushes 37 to any desired position relative to the poles of the inductor-magnet.

The dynamo is supported by two base-pieces 50 and 51, which are either formed integral with the parts 10 and 11 of the casing or secured thereto in any suitable manner.

Assuming that the hollow cylinder 12 is of positive polarity and the cylinder 13 of negative polarity, the operation of my dynamo is as follows: The lines of magnetic force flow from the cylinder 12 into the projection 24 and thence to the pole 21. From the pole 21 the lines of magnetic force flow into the core 18 of the armature, around the said core, and into the pole 22. From the pole 22 they flow through the projection 25 into the cylinder 13 and thence back to the cylinder 12 through the casing 10 and 11. The rotating projections 24 and 25 form with the stationary cylinders 12 and 13 what I term a "sliding" or "rotary" magnetic joint, through which it will be seen all the lines of magnetic force must pass. As the projections 24 and 25 of the inductor-magnet are within the field-magnet coils 14 and 15, they will come within the direct influence of the said coils, so that the inductor-magnet will have lines of magnetic force induced within itself in addition to those generated in the casing 10 and 11 and cylinders 12 and 13, formed thereon. As the inductor-magnet revolves the points at which the lines of magnetic force enter and leave the armature constantly change with the movement of the pole-pieces of the said inductor-magnet, thus producing in the armature what I term a "rotating progressive field of magnetic force."

As the inductor-magnet rotates the disk 36, carrying the brushes 37, rotates with it, thus constantly keeping the said brushes at the proper points on the commutator to receive the current generated in the armature by the rotating progressive field of magnetic force. From one of the brushes 37 the current passes along one of the wires 40, ring 41, carbon 43, spring 44, and screw 45 to the line-wire 46. From the other brush the current passes along the other wire 40, ring 41, carbon 43, spring 44, and screw 45 to the wire 47. From the wire 47 the current passes through the coil 15, over the wire 48, and through the coil 14 to the line-wire 46.

It is obvious that many changes may be made in the form and construction of my dynamo without departing from the spirit of my invention.

Having fully described my invention, what I claim as new, and desire to secure by Letters Patent of the United States, is—

1. In a dynamo-electric machine or motor, a stationary armature, a stationary field-magnet or magnets, a rotating inductor-magnet having poles of opposite polarity magnetically insulated from each other, and a casing completely inclosing said armature, field magnet or magnets and inductor-magnet and forming part of the magnetic circuit.

2. In a dynamo-electric machine or motor, a stationary armature, a stationary field magnet or magnets, a rotating inductor-magnet, a sliding magnetic joint between said inductor-magnet and field magnet or magnets, and a casing completely inclosing said armature, field magnet or magnets and inductor-magnet and forming part of the magnetic circuit.

3. In a dynamo-electric machine or motor, a stationary armature, a stationary field magnet or magnets, a rotating inductor-magnet having poles of opposite polarity, said poles of opposite polarity being magnetically and electrically insulated from each other, sliding magnetic joints between said inductor-magnet and the pole-pieces of said field magnet or magnets, and an inclosing casing forming part of the magnetic circuit.

4. In a dynamo-electric machine or motor, a stationary armature, a stationary field magnet or magnets, a rotating inductor-magnet, a stationary commutator, rotating commutator-brushes receiving the current from said commutator, and stationary brushes receiving the current from said rotating brushes.

5. In a dynamo-electric machine or motor, a stationary armature, a stationary field magnet or magnets, a rotating inductor-magnet having poles of opposite polarity, said poles of opposite polarity being magnetically insulated from each other, sliding magnetic joints between said inductor-magnet and the pole-pieces of said field magnet or magnets, an inclosing casing forming part of the magnetic circuit, a stationary commutator electrically connected with said armature, revolving commutator-brushes receiving the current from said commutator, and stationary brushes receiving the current from said rotating brushes.

6. In a dynamo-electric machine or motor, a stationary armature, an inclosing casing carrying a field magnet or magnets and forming part of the magnetic circuit, and a rotating inductor-magnet in sliding magnetic contact with the pole-pieces of said field magnet or magnets and itself under the direct influence of the coils of the field magnet or magnets.

7. In a dynamo-electric machine or motor, a rotating inductor-magnet provided with pole-pieces of opposite polarity intermediate of its axial length, axial projections at each end of said inductor-magnet, magnetic carriers surrounding said axial projections and forming sliding magnetic joints therewith, stationary field-magnet coils surrounding said magnetic carriers, a stationary ring-armature surrounding said inductor-magnet, and a casing surrounding said parts and magnetically connecting the outer ends of said magnetic carriers.

8. In a dynamo-electric machine or motor, an inclosing casing forming part of the magnetic circuit of the machine, a stationary ring-armature supported within said casing, projections on the interior of said casing, stationary field-magnet coils carried by said projections, and a rotating inductor-magnet having pole-pieces of opposite polarity magnetically and electrically insulated from each other, said inductor-magnet rotating within said stationary ring-armature and receiving magnetism from said stationary field-magnet coils.

9. In a dynamo-electric machine or motor, an inclosing casing forming part of the magnetic circuit of the machine, a stationary ring-armature supported within said casing, projections on the interior of said casing, stationary field-magnet coils carried by said projections, a rotating inductor-magnet within said stationary ring-armature, said inductor-magnet having pole-pieces of opposite polarity magnetically insulated from each other, and axial projections on said inductor-magnet, said axial projections entering the said projections on the interior of the casing and forming a sliding magnetic joint therewith.

10. In a dynamo-electric machine or motor, an inclosing casing forming part of the magnetic circuit of the machine, a stationary ring-armature supported within said casing, projections on the interior of said casing, stationary field-magnet coils carried by said projections, a rotating inductor-magnet having pole-pieces of opposite polarity magnetically insulated from each other, said inductor-magnet rotating within said stationary ring-armature and receiving magnetism from said stationary field-magnet coils, a stationary commutator carried by said casing, commutator-brushes for said commutator, said commutator-brushes being carried by said inductor-magnet and revolving therewith, and stationary brushes receiving the current from said rotating brushes.

11. In a dynamo-electric machine or motor, an inclosing casing, a stationary ring-armature within said casing, stationary field-magnet coils also within said casing, a rotating inductor-magnet within said stationary ring-armature, a stationary commutator carried by the exterior of said casing, a shaft or spindle carried by said inductor-magnet and rotating therewith, brushes carried by said shaft or spindle and bearing on said commutator, suitable conducting-rings carried by said shaft or spindle and electrically connected with said brushes, and stationary brushes receiving the current from said rings.

In testimony whereof I have hereunto set my hand and affixed my seal in the presence of the two subscribing witnesses.

LEWIS C. RICE. [L. S.]

Witnesses:
 E. E. VERNELL,
 W. A. ALEXANDER.